Dec. 19, 1967 W. F. OTT 3,358,351

PISTON RING CONTRACTION DEVICE

Filed Feb. 18, 1966

INVENTOR
WILLIAM F. OTT
BY

ATTORNEY

United States Patent Office 3,358,351
Patented Dec. 19, 1967

3,358,351
PISTON RING CONTRACTION DEVICE
William F. Ott, St. Louis, Mo., assignor to McQuay-Norris Manufacturing Company, St. Louis, Mo., a corporation of Missouri
Filed Feb. 18, 1966, Ser. No. 528,613
1 Claim. (Cl. 29—224)

ABSTRACT OF THE DISCLOSURE

For use in the installation of ring-equipped pistons in cylinders, a tool having a band of length approximating the perimeter of the rings when compressed to cylinder diameter, and having projecting from one end thereof a strap having parallel margins receivable within a loop upset outwardly from the body of the band adjacent its other end. The strap includes a locking tab disposed centrally thereof, and adapted to be bent back over the bridge of the loop while the strap is maintained in circumferential alignment by the ends of the loop. The tool also has a pair of abutments, one on the end of the strap, and one at the other end of the band, but sufficiently spaced from that end that the strap cannot be drawn past it.

---

This invention relates generally to devices for contracting piston rings prior to, and maintaining them contracted to, at most, the diameter of the cylinder in which they are to be used, during installation of such rings and their associated piston in a cylinder.

In cylinder piston combinations, whether in pumps, internal combustion engines, or other means in which energy derived from fluid under pressure is converted into mechanical motion, or energy derived from mechanical motion is utilized to impose pressure upon fluid, piston rings are mounted upon the piston for sliding movement against the wall of the cylinder bore. Most usually, such piston rings, when in their relaxed condition, i.e., outside the cylinder bore, have a greater diameter than that which they assume when in operating position within the cylinder bore. Accordingly, to install such piston rings in a cylinder bore, it is required that they be contracted to a diameter not in excess of that of the cylinder bore as an antecedent to installing them in such a bore and if, as is usually the case, such piston rings are mounted in grooves provided at the ring belt of a piston, it is also necessary to install the rings, with or without expander springs, in the appropriate piston ring grooves before at least the ring belt of the piston is inserted into the cylinder bore in which it is to operate.

In order to facilitate the installation of piston rings as aforesaid, a variety of tools has heretofore been provided. Such tools have run the gamut of elaborate and expensive contrivances, whose useful life is almost without limit, to more or less single-use contractible collars usually made of sheet metal. One such device in the latter category is illustrated by United States Patent No. 3,131,466, which in a form different from that illustrated in the patent, i.e., wherein the upper and lower edges of the collar are parallel, has gone into considerable use. Such sheet metal collars have the advantage not only of being cheap, but also of being operable by a common pair of pliers such as found in the tool kit of every mechanic. On the other hand, such collars as heretofore provided have required the exercise of more tedious and studied attention during use than present-day mechanics or mechanics' helpers are likely to give them. They are likely to cock, distort, or assume a cone-like or helix-like configuration in which the ends adjacent the gap in the collar may become disaligned with the result that an end, or other segment of the periphery of a ring supposed to be confined by the collar and maintained thereby at a contracted diameter less than the relaxed diameter of the piston ring, is likely to escape unnoticed from the confinement of the collar, with consequent damage to the ring as an effort is made to force it into the cylinder bore. Indeed, collars of the character disclosed in the aforesaid patent have heretofore been so constructed and arranged as to induce such distortion and disalignment of the collar. Not only have they failed to provide a construction and arrangement which effectually inhibits such distortion and disalignment, but they have also omitted to provide any means for preventing the overlapping of the ends of the collar so that the internal diameter at the overlapped ends is less than beyond the end of the interior lap, as frequently occurs when, through oversight or otherwise, the collar being employed on a given size installation is intended for a larger size. In the latter circumstances, if the gap of a piston ring happens to be disposed within the collar, so that one end is engaged by the interior lap of the overlapped ends of the collar, while the other end of the piston ring is beyond the end of the inside lap of the collar, the latter end of the ring will be at a greater diameter than the end thereof at the other side of its gap, and in such cases, the end of the piston ring at the smaller diameter may be readily received by the cylinder, but the end of the piston ring at the larger diameter may foul and be subject to damage in an effort to force it into the cylinder.

The general object of the present invention is to provide a collar-like piston-ring-contracting device, in which the intended alignment is maintained with assurance both during application of the collar to contract the rings, and during the time in which the collar is locked in ring-contracting position.

Another object of the invention is to provide such a collar-type ring-contracting device in which the possibility of contracting the collar to the degree necessary to produce overlapping of its ends is mitigated.

The first of the aforesaid objects is accomplished by the provisions of a collar-type contracting device in which one end of the collar or band is provided with a loop, and the other end of the collar or band is provided with a tang or strap projecting circumferentially beyond the active portion of the collar or band; and the tang and the loop are so proportioned relative to each other that the edges of the tang make contact with, and are thereby constrained and confined by, the loop. Moreover, the collar or band is provided with oppositely addressed abutments which may be gripped, respectively, by opposite jaws of a pair of pliers, and such abutments are, in accordance with the present invention, arranged in circumferential alignment with the aforesaid tang and loop, so that careless application of the pliers cannot result in the application of force having a component which induces distortion or disalignment during tightening of the collar; and in addition thereto, the collar or band is equipped with a locking device in alignment with said abutments so that once the tightening force at the abutments is released, the restraining force is applied in the same circumferential orientation.

The second of the aforesaid objectives is accomplished by providing the abutments in such circumferential orientation relative to each other that when the collar or band has been contracted to the minimum diameter at which it is intended to operate, one of the abutments is rendered ineffective. In the embodiment disclosed in the drawings, this result is achieved by so locating the abutment near one end of the collar that the aforesaid tang rides over that abutment and renders it inoperative when the collar has been tightened to its minimum intended diameter.

Referring now to the drawings for an illustrative embodiment of the invention:

Figure 1:
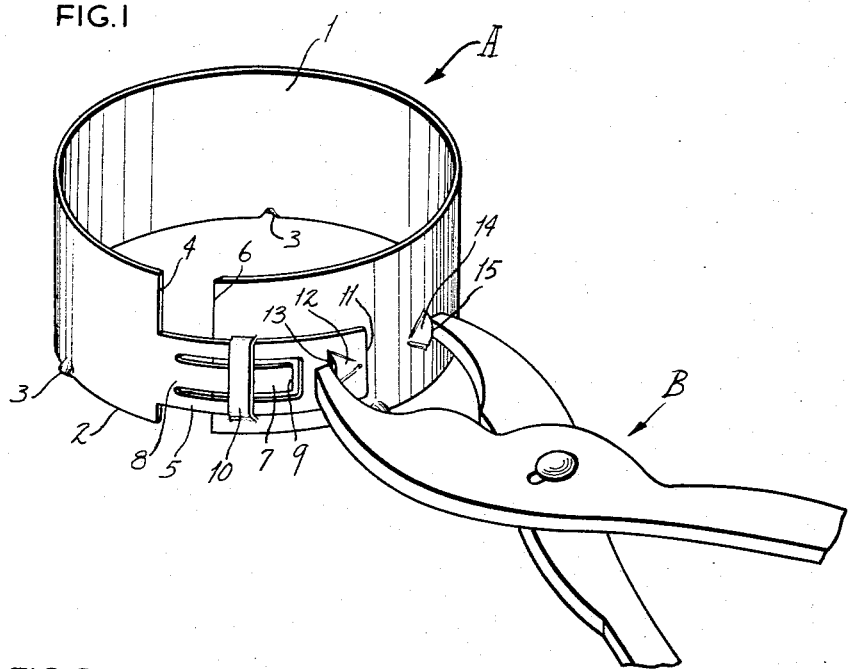
FIGURE 1 is a perspective view of the ring-contracting device (without piston or rings) and illustrating the manner in which it is contracted by use of common pliers.

Referring now to the drawings, in FIGURE 1 there is disclosed a ring-contracting device A comprising an annular band 1 which may be constructed of sheet metal, or any other material which provides a smooth interior, and which is inherently flexible and resilient in the circumferential direction, but has sufficient stiffness in the axial direction that it may be flexed to a decreasing circumference during use (when tightened about the ring belt of a piston) without substantial distortion in the axial direction. The band 1 is ordinarily formed from a unitary strip of sheet metal, of about 0.015–0.025" thickness, cut in a rather rectangular configuration to produce a blank such as that shown in FIGURE 2. The blank may, if desired, be bent around a cylindrical form for the purpose of imparting the more or less circular configuration shown in FIGURE 1, or, if desired, the rounding of the blank may be done at the point of use. The adjustable circumference of the contracting device should be of sufficient latitude to provide for its loose application onto and surrounding the ring belt of a piston and its complement of piston rings which have been previously installed in the ring groove of the piston and are in their relaxed condition (i.e., have a diameter greater than that which they have when in the cylinder). Additionally, the resiliency of the contracting device must permit its contraction to a smaller circumference no greater than that of the cylinder bore into which the piston and rings are to be installed, so that it can forcibly contract the piston rings to a diameter small enough to facilitate their insertion, while in the ring grooves of the piston, into a cylinder bore. Provided along the downward edge 2 of the band 1 are a plurality of projections 3 which have been created as by punching to extend outward from the outer surface of said band so that they may engage the upper surface of a cylinder block C, as when the piston P is being forced from band 1 into said cylinder bore (see FIGURE 3). Projecting from an end 4 of the band 1, and connected integrally thereto, is a strap member 5 which is of a sufficient length to provide substantial overlap with opposite end 6 of the band when the latter is at a circumference whose diameter is no less than the relaxed diameter of the piston rings. The strap 5 is of a sufficient width, and is so connectible with the opposite end 6 of band 1, that it stabilizes the band 1 against the tendency to conify, or horizontally buckle, or become diametrically disaligned (as in a helix) during use. Such tendency is particularly undesirable at the edge 2 which rests upon the cylinder block as aforesaid, and accordingly it is preferred to so locate strap 5 that it is closer to edge 2 than to the upper edge of band 1, but withal substantially spaced from edge 2.

Within the strap member 5 there is cut out (along three sides) a locking tab 7 which is integrally connected at one end 8 to said strap member, but which is otherwise free for movement in the radial direction, between its root end 8 and free end 9, so that it may be bent outwardly from the outer surface of the band and locked for sustaining the contracting device at any diameter desired. Located proximate to the end 6 of the band 1 is a loop 10 slit from, and upset outwardly relative to, the outer surface of the band 1. The loop 10 is integrally connected at its upper and lower ends with the body of band 1, but the loop is of such length between its integral connections that it provides the space necessary for reception of the strap member 5 through said loop contiguous to the outer surface of the band. This loop member 10 may be constructed by attaching, as by weld or any other method, a properly dimensioned and preformed loop member to the outer surface of said band at the revealed location, but preferably, it may be formed by a simple punch press operation which both makes the necessary slits and forces the intervening portion of the band outwardly to the necessary degree.

Projecting from the strap member 5, proximate its end 11, is a lug 12 which is formed integrally in the strap member as through a lancing operation. This lug is so formed and disposed so as to provide a projecting edge 13 which may be easily grasped for retention by pliers B when it is desired to contract the band into a smaller diameter. Likewise, a lug 14 having a projecting edge 15 is provided integrally in the band 1 so as to furnish an opposite grasping area where leverage may be acquired by the pliers when used for contracting the band about piston rings R in the ring grooves of piston P.

The contraction device, as shown, is designed so that as the end 11 of the strap 5 approaches the lug 14 while the band 1 is being forcibly contracted to a decreased diameter, the end 11 reaches edge 15 at or before the time ends 4 abut with ends 6. This prevents further contraction with pliers and signals to the installing mechanic that, if the rings he is attempting to install will not now go into the cylinder bore, he is either disaligned with the cylinder or the contraction device he is using is too large for the particular installation. Avoidance of the possibility of overlap between ends 4 and 6 is important because such overlap reduces the internal diameter by the thickness of band 1, and if the gap in a ring happens to be disposed at or near the overlap, the ring may be insufficiently contracted at one side of the gap, and it will be damaged if forced into the cylinder.

Figure 3:
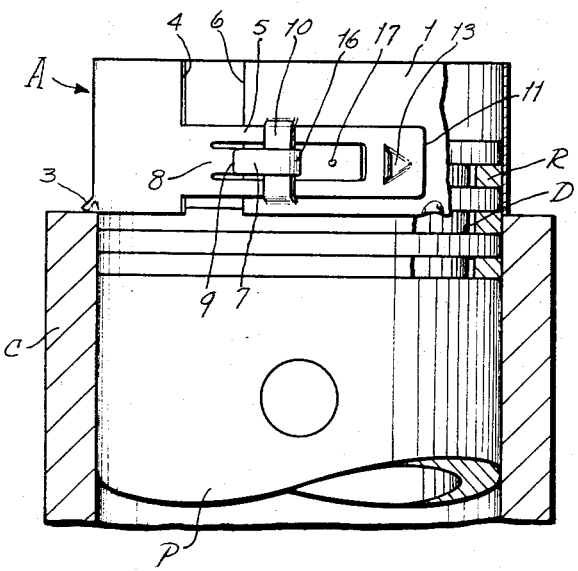
FIGURE 3 is a view, partly in section, showing the relationship between the contracting device, a cylinder, and a piston with its rings contracted, while the piston is in the process of being inserted into the cylinder bore.

In FIGURE 3, the contracting device A is disclosed as tightly surrounding an upper portion of the ring belt of piston P and also the upper two of its associated piston rings. It is to be noted that the strap member 5 is integrally affixed to the end 4 of the band 1 at the position slightly downward from the axial mid-point of said band, and it has been found that when the contracting device is designed and utilized in accordance with this arrangement, the most efficient stabilization of said contracting device and perfect alignment of the rings are achieved and maintained. As the contracting device is tight about the rings, it is free from distortion even while the latter are being inserted into the cylinder bore. Such distortion might allow the rings to engage and bind upon the upward surface of the cylinder bore, severely damaging them, and eventually impairing their efficiency during the operation of the piston cylinder combination. The width and location of the strap member of this invention precludes the occurrence of such detriments during use of the present contracting device.

When the band 1 has been contracted into tight closure around the piston, it may be retained in this position by simply bending the end 9 of the locking tab 7 outwardly over the loop member 10 until it engages, as at 16, for retaining the contracting device in this tightened state.

Figure 2:
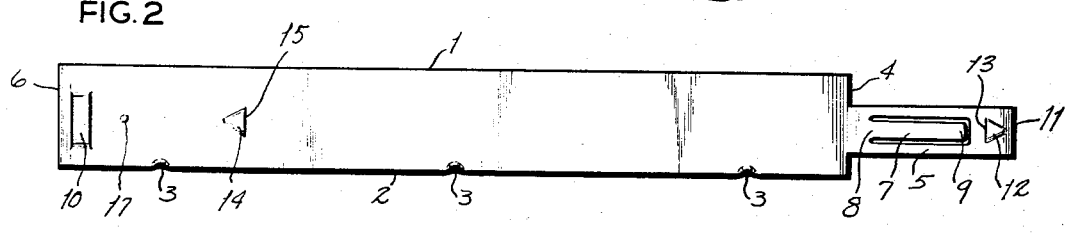
FIGURE 2 is a developed view of the compression member showing its outer surface.

In FIGURE 2, it can be seen that the projections 3 are equally spaced less than a half-circumference apart along the bottom edge 2 of the band, so that they will engage the upper surface of the cylinder bore at equidistant areas to prevent any segment of edge 2 from tipping into the cylinder bore while the piston and rings are being forced into said cylinder bore. Additionally, the downward edge 2 of said band may be designed and formed so as to accommodate an upper surface of any contour provided on the cylinder bore, such as an inclined surface, so that the edge may totally engage the cylinder bore, without causing any deformation in the alignment of the contracting device, and consequently the rings surround the piston.

Extending slightly outwardly from the band 1, and located proximate to and centrally of the loop member 10, is an outwardly projecting dimple 17. This dimple 17 is disposed for engaging and camming the locking tab 7 outwardly from alignment with the strap member 5 while the latter is being pulled for tightening the contracting device around the piston rings. This outward camming of the locking tab 7 makes it easy to be grasped and bent after the contracting device has been tightened to the extent desired. The same result can be achieved without the dimple by preliminarily bending the tab 7 on a greater radius of curvature than the body of band 1.

In the usual process of installing a piston and its associated rings into a cylinder bore, the rings are first installed in the appropriate piston ring grooves of the piston while the piston is outside the cylinder, and usually has connected to it the usual connecting rod. In order to install the rings in their corresponding grooves, it is usually necessary to expand the rings beyond their relaxed condition, so that the inside diameter of the rings is sufficient to permit them to pass over the lands which define the piston ring grooves. The lowermost ring is usually applied first, and succeeding rings applied in the grooves located successively upwardly from the lowermost ring. Once a ring has been installed in a groove, and the forces tending to expand it, as aforesaid, released, the ring contracts to its relaxed condition, unless an expander spring is interposed between it and the bottom of the ring groove, in which event the contraction of the ring is normally to a diameter somewhat greater than that of the ring in its relaxed condition. In their relaxed condition, the outside diameter of the several rings exceeds the outside diameter of the lands which define the grooves in the ring belt of the piston, such excess being greater than the operating clearance between the piston lands and the bore of the cylinder. In order to contract the several rings to a diameter which will permit them to pass into cylinder bore, the contracting device shown in the drawings is applied about the ring belt of the piston so as to embrace all rings, and the strap or tang 5 is passed through loop 10 on the outside of band 1 near end 6. Band 1 is then compressed by hand until the edges 13 and 15 of lugs 12 and 14, respectively, are sufficiently close together to be gripped by the jaws of pliers, as shown in FIGURE 1 of the drawings. Thereupon, force is applied to the pliers to contract the band 1 to a diameter no greater than the diameter of the cylinder bore. Such contraction may or may not bring end 4 of band 1 into abutment with end 6 thereof, depending upon the size of band 1 and the size of the cylinder bore. Having contracted the band 1 to the desired extent by means of the pliers B, the free end 9 of locking member 7 is grasped with the fingers and turned outwardly about loop 10 to lock the band 1 in the contracted position to which it was moved by force of the pliers. Thereupon, the piston, with its associated rings (now contracted to a diameter no greater than that of the cylinder bore) and with band 1 surrounding the ring belt and locked in contracted position, is inserted, skirt first, into the cylinder bore. Once the skirt of the piston is within the bore, the ring belt and the contracting device are precisely centered with respect to the cylinder bore. The piston is lowered into the cylinder bore until projections 3 come to rest upon the upper end of the cylinder wall, as shown in FIGURE 3. With the parts in this position, a downward force on the head of the piston drives the ring belt of the piston axially downward relative to band 1. As each successive piston ring emerges from edge 2 of band 1, it enters the bore of the cylinder at the same diameter as that to which it was contracted by band 1. As long as edge 2 of band 1 is held in snug engagement with the upper end of the cylinder wall, as shown in FIGURE 3, there is no opportunity for any ring to spring outwardly to an extent sufficient that it will foul against the upper end of the cylinder bore and be damaged thereby. When the uppermost ring has passed below edge 2 of band 1, the band is removed and the installation is complete. Ordinarily, the band can be re-used several times, or until locking member 7 has become so weakened by repeated bending at the same place that it can no longer be depended upon to lock the band 1 at the position of contraction to which it was moved by the pliers B in the first place.

A given band 1 is adapted to be used only on a limited range of cylinder sizes, as, for example, with a range of internal cylinder circumferences varying as much as about a half inch in the embodiment shown. The minimum circumference for which a given band is usable depends upon the spacing between the end 11 of strap 5 and the abutment edge 15 of lug 14, which are preferably disposed so that end 11 has overlapped lug 14 by the time ends 4 and 6 of band 1 come into abutment, which is at the minimum intended diameter for the given band. The maximum in the size range for which a given band is intended to be used is determined by the spacing between edge 15 of lug 14 and edge 13 of lug 12, which must be close enough together, when the band has been placed hand-tight about the piston rings, that the two abutments may be reached by the jaws of the pliers, as shown in FIGURE 1. It is not essential that ends 4 and 6 be brought into abutment with each other at any time, but it is important that such ends 4 and 6 are never permitted to overlap even to the extent that end 4 may come into abutment against loop 10. Such overlapping, if permitted, would cause an adjacent gap end of a piston ring in engagement adjacent end 6 to be at a lesser diameter than the opposite gap end in engagement with band 1 adjacent end 4, and such difference in diameter, i.e., the thickness of band 1, may, if permitted, result in damage to the end of the ring which is at the larger diameter. When the parts are arranged so that end 11 of strap 5 overlaps lug 14 at or before the band 1 is contracted to a degree such that end 4 comes into abutment with end 6, overlapping of the ends of the band is prevented by end 11 coming into engagement with the same jaw of the pliers which is gripping lug 14. If and when the latter occurs, the mechanic is immediately signaled that he has reached the minimum diameter for which the given band 1 was intended to be used.

In fact, it is preferable that the minimum diameter for which a given band 1 is intended to be used be such that the space between ends 4 and 6 is never completely closed. The presence of such space enables visual inspection as the operation proceeds, which is often desirable. Accordingly, where the maintenance of such space is desirable, even at the minimum extreme of diameter, lug 14 is preferably positioned with reference to the end 11 of strap 5 that said end covers lug 14 before ends 4 and 6 of band 1 come into abutment, much less overlap.

The stabilization provided by the inter-engagement of the edges of strap 5 with the interior of loop 10 prevents any distortion or disalignment of the band 1 into a conic or helix-like shape. While it is sometimes desirable to make the band 1 with a slightly conic aspect, with the smaller diameter at the bottom, so that the respective rings are contracted more and more as they are forced downwardly through the contracting device, and such may be done without departing from the present invention, it is important to preclude substantial change in such conic aspect during the process of installation, and the present invention, by virtue of the location and arrangement of strap 5 and its cooperating loop 10, does preclude such change.

It is to be understood that the above described details and arrangements of the various parts of the invention are simply illustrative of the application of the principles of the invention. Numerous other arrangements may be readily devised by those skilled in the art which will embody the principles of the invention and fall within the spirit and scope thereof.

Having thus described the invention, what is claimed and desired to be secured by Letters Patent is:

A device for contracting and retaining piston rings within a piston groove during installation in a cylinder, comprising, an annular band having inherent flexibility providing for circumferential change, said band having ends which are in proximity to each other, a strap member integral with said band and projecting from one of said ends, a locking tab integral with said strap member and being flexible for allowing for bending from planar alignment with said strap member, a first lug provided proximate to a free end of said strap member, a closed loop member provided proximate to the other end of said band and disposed for receiving in sliding engagement said strap member and locking tab, a projection provided on said band proximate said loop member and disposed for slidingly engaging said locking tab, for forcing said locking tab from planar alignment with the strap member, a second lug provided on said band and disposed in alignment with said first lug, means cooperating with said lugs for compelling said band into smaller circumference, and said locking tab cooperating with said loop member for retaining said band in closure.

References Cited

UNITED STATES PATENTS

| | | | |
|---|---|---|---|
| 1,690,643 | 11/1928 | Lavender | 24—20 |
| 2,218,717 | 10/1940 | McKee | 24—20 |
| 2,374,541 | 4/1945 | Hartman | 24—20 |
| 3,189,961 | 6/1965 | Heller | 24—20 |

FOREIGN PATENTS 826,295   12/1959   Great Britain.

OTHELL M. SIMPSON, *Primary Examiner.*

WILLIAM FELDMAN, J. C. PETERS,
*Assistant Examiners.*